(12) United States Patent
Kim (10) Patent No.: US 12,444,433 B2
(45) Date of Patent: Oct. 14, 2025

(54) METHOD AND SYSTEM FOR PROVIDING VOICE RECOGNITION TRIGGER AND NON-TRANSITORY COMPUTER-READABLE RECORDING MEDIUM

(71) Applicant: VTOUCH CO., LTD., Seoul (KR)

(72) Inventor: Seok Joong Kim, Seoul (KR)

(73) Assignee: VTOUCH CO., LTD., Seoul (KR)

( * ) Notice: Subject to any disclaimer, the term of this patent is extended or adjusted under 35 U.S.C. 154(b) by 574 days.

(21) Appl. No.: 17/717,364

(22) Filed: Apr. 11, 2022

(65) Prior Publication Data

US 2022/0238134 A1 Jul. 28, 2022

Related U.S. Application Data

(63) Continuation-in-part of application No. 16/551,888, filed on Aug. 27, 2019, now Pat. No. 11,315,557, which is a continuation of application No. PCT/KR2018/002337, filed on Feb. 26, 2018.

(30) Foreign Application Priority Data

Feb. 27, 2017 (KR) .................. 10-2017-0025738

(51) Int. Cl.
*G10L 25/87* (2013.01)
*G06F 3/01* (2006.01)
*G10L 25/93* (2013.01)

(52) U.S. Cl.
CPC .............. *G10L 25/87* (2013.01); *G06F 3/017* (2013.01); *G10L 25/93* (2013.01)

(58) Field of Classification Search
None
See application file for complete search history.

(56) References Cited

U.S. PATENT DOCUMENTS

| | | | |
|---|---|---|---|
| 8,218,397 B2* | 7/2012 | Chan | G01S 11/14 367/124 |
| 9,632,748 B2* | 4/2017 | Faaborg | G06F 3/167 |
| 9,830,924 B1* | 11/2017 | Degges, Jr. | G10L 15/22 |
| 9,972,339 B1* | 5/2018 | Sundaram | G01S 3/8083 |
| 10,027,662 B1* | 7/2018 | Mutagi | H04L 63/0861 |
| 10,074,359 B2* | 9/2018 | Silveira Ocampo | G10L 13/0335 |

(Continued)

FOREIGN PATENT DOCUMENTS

| | | |
|---|---|---|
| JP | 2000338995 A | 12/2000 |
| JP | 2006251298 A | 9/2006 |

(Continued)

OTHER PUBLICATIONS

International Search Report for PCT/KR2018/002337 of Jun. 12, 2018.

*Primary Examiner* — Seong-Ah A Shin
(74) *Attorney, Agent, or Firm* — Dinsmore & Shohl LLP; Yongsok Choi, Esq.

(57) ABSTRACT

A method for providing a voice recognition trigger and a system therefor, and a non-transitory computer-readable recording medium are provided. The method for providing the voice recognition trigger includes: calculating a distance change between a device and an object on the basis of proximity information detected by the device; and determining whether or not the voice recognition trigger of the device is provided with reference to the distance change between the device and the object.

7 Claims, 6 Drawing Sheets

(56) References Cited

U.S. PATENT DOCUMENTS

| | | | |
|---|---|---|---|
| 10,388,280 B2* | 8/2019 | Agrawal | G10L 15/22 |
| 10,811,002 B2* | 10/2020 | Cho | G10L 15/183 |
| 2013/0094668 A1* | 4/2013 | Poulsen | H03G 3/301 |
| | | | 381/107 |
| 2013/0275077 A1* | 10/2013 | Kim | G01S 5/186 |
| | | | 702/152 |
| 2014/0081630 A1* | 3/2014 | Jung | G10L 21/00 |
| | | | 704/225 |
| 2014/0142927 A1* | 5/2014 | Campbell | G10H 1/0091 |
| | | | 704/201 |
| 2014/0330560 A1* | 11/2014 | Venkatesha | G06F 21/32 |
| | | | 704/235 |
| 2015/0039310 A1* | 2/2015 | Clark | G10L 15/063 |
| | | | 704/244 |
| 2015/0160919 A1* | 6/2015 | Kim | H04N 21/42222 |
| 2015/0170635 A1 | 6/2015 | Fleizach et al. | |
| 2015/0302870 A1* | 10/2015 | Burke | H04W 4/026 |
| | | | 704/246 |
| 2015/0340040 A1* | 11/2015 | Mun | G10L 17/22 |
| | | | 704/246 |
| 2015/0346912 A1* | 12/2015 | Yang | H04L 51/08 |
| | | | 715/727 |
| 2016/0156761 A1* | 6/2016 | Beaurepaire | G10L 25/78 |
| | | | 455/414.1 |
| 2016/0284350 A1* | 9/2016 | Yun | G10L 15/22 |
| 2017/0025121 A1* | 1/2017 | Tang | G10L 15/20 |
| 2017/0075548 A1* | 3/2017 | Fukazawa | G09G 5/14 |
| 2017/0311092 A1* | 10/2017 | Secall | G10L 25/60 |
| 2018/0060144 A1* | 3/2018 | Capobianco | G06F 3/0346 |
| 2018/0121623 A1* | 5/2018 | Boesen | A61B 5/6817 |
| 2018/0151180 A1* | 5/2018 | Yehuday | G10L 15/24 |
| 2018/0284887 A1* | 10/2018 | Fan | G06F 3/038 |
| 2019/0037173 A1* | 1/2019 | Lee | G06F 3/04842 |

FOREIGN PATENT DOCUMENTS

| | | |
|---|---|---|
| KR | 20110100620 A | 9/2011 |
| KR | 20150113701 A | 10/2015 |

* cited by examiner

METHOD AND SYSTEM FOR PROVIDING VOICE RECOGNITION TRIGGER AND NON-TRANSITORY COMPUTER-READABLE RECORDING MEDIUM

CROSS-REFERENCE TO RELATED APPLICATION(S)

This application is a continuation-in-part of U.S. application Ser. No. 16/551,888 filed on Aug. 27, 2019 issued as U.S. Pat. No. 11,315,557, which is a continuation application of Patent Cooperation Treaty (PCT) International Application Serial No. PCT/KR2018/002337 filed on Feb. 26, 2018, which claims priority to Korean Patent Application Ser. No. 10-2017-0025738, filed on Feb. 27, 2017. The entire contents of U.S. application Ser. No. 16/551,888, PCT International Application Serial No. PCT/KR2018/002337, and Korean Patent Application Ser. No. 10-2017-0025738 are hereby incorporated by reference.

FIELD OF THE PRESENT DISCLOSURE

The present disclosure relates to a method, system and non-transitory computer-readable recording medium for providing a voice recognition trigger.

BACKGROUND

Recently, IT devices with voice recognition functions are increasing as interest in user interfaces is increased and voice processing technologies are developed. For example, smart phones, smart watches, smart TVs, smart refrigerators and the like are widely used, which can recognize a voice of a user and perform an operation requested by the user. As an example of such a prior art, Korean Laid-Open Patent Publication No. 2016-39244 has introduced a technique of determining whether a voice-initiated action is included in audio data when a computing device receives the audio data, and providing a user with a display indicating that the voice-initiated action is recognized through the computing device, when it is determined that the voice-initiated action is included in the audio data.

However, according to the techniques introduced so far as well as the above-described conventional technique, a user should press a button or input a predetermined trigger word to specify a point when the user starts a voice input, before the user starts the voice input. The former method of pressing a button is inconvenient because the user cannot perform the voice input when the user cannot use his/her hands freely. The latter method of speaking a predetermined trigger word has limitations in that it is difficult to specify the starting point of the voice input due to various noises (e.g., voices of others) produced in the same space even when the user moves just a little bit away from a voice recognition device, and it takes quite a long time to start the voice input because the user can start the voice input only after sound or light feedback is given in order to assure the user that the voice input has started, even if the user speaks the predetermined trigger word.

In this connection, the inventor(s) present a technique for a voice recognition trigger, which estimates a distance between a user and a device for detecting a voice, and a distance between the device and a location where a voice detected by the device is uttered, and determines that the voice detected by the device is an object of voice recognition, when the two estimated distances are similar at or above a predetermined level. Further, the inventor(s) present a technique for a voice recognition trigger that determines whether or not a voice recognition trigger of a device is provided based on a distance change between the device and a user, without pressing a button or inputting a trigger word.

SUMMARY OF THE PRESENT DISCLOSURE

One object of the present disclosure is to solve all the above-described problems.

Another object of the present disclosure is to assist a user to quickly input a voice by eliminating unnecessary processes for starting a voice input.

Yet another object of the present disclosure is to minimize the influence of ambient noise by allowing a voice to be inputted in proximity to a device, and to provide a voice recognition trigger that is accurately activated even with a small voice.

Still another object of the present disclosure is to provide a system and method capable of accurately detecting a time point when a device starts voice recognition.

The representative configurations of the present disclosure to achieve the above objects are described below.

According to one aspect of the present disclosure, there is provided a method for providing a voice recognition trigger, comprising the steps of: calculating a distance change between a device and an object on the basis of proximity information detected by the device; and determining whether or not the voice recognition trigger of the device is provided with reference to the distance change between the device and the object.

According to one embodiment of the present disclosure, the proximity information may be obtained by a proximity sensor of the device.

According to one embodiment of the present disclosure, in the determining step, a point at which the device is adjacent to the object within a predetermined distance as the device approaches the object at a speed equal to or less than a predetermined speed, with reference to the distance change between the device and the object, may be determined as a voice recognition start point.

According to one embodiment of the present disclosure, in the determining step, a time point at which the distance between the device and the object is held constant in a state in which the device is adjacent to the object within a predetermined distance, with reference to the distance change between the device and the object, may be determined as a voice recognition start point. Here, a time point at which a time period during which the distance between the device and the object is held constant in the state in which the device is adjacent to the object within the predetermined distance reaches a predetermined time period, may be determined as a voice recognition start point.

According to another aspect of the present disclosure, there is provided a method for providing a voice recognition trigger, comprising the steps of: calculating a distance change between a device and an object on the basis of proximity information detected by the device, and calculating a movement direction of the device on the basis of movement information detected by the device; and determining whether or not the voice recognition trigger of the device is provided with reference to the distance change between the device and the object and the movement direction of the device.

According to one embodiment of the present disclosure, in the determining step, a time point at which the device is stopped after moving upward and decelerating, with reference to the distance change between the device and the object and the movement direction of the device, may be determined as a voice recognition start point. Here, when the distance between the device and the object at the time point at which the device has stopped is within a predetermined distance, the time point at which the device has stopped may be determined as the voice recognition start point.

According to one embodiment of the present disclosure, in the determining step, a time point at which the device moves upward and is adjacent to the object within a predetermined distance, with reference to the distance change between the device and the object and the movement direction of the device, may be determined as a voice recognition start point.

According to one embodiment of the present disclosure, the proximity information may be obtained by a proximity sensor of the device, and the movement information may be obtained by an IMU sensor of the device.

According to yet another aspect of the present disclosure, there is provided a voice recognition system for providing a voice recognition trigger, comprising: a calculation unit configured to calculate a distance change between a device and an object on the basis of proximity information detected by the device; and a determination unit configured to determine whether or not the voice recognition trigger of the device is provided with reference to the distance change between the device and the object.

In addition, there are further provided other methods and systems to implement the present disclosure, as well as non-transitory computer-readable recording media having stored thereon computer programs for executing the methods.

According to the present disclosure, it is possible to assist a user to quickly input a voice by eliminating unnecessary processes for starting a voice input.

According to the present disclosure, by determining whether or not a voice recognition trigger of a device is provided with reference to a distance change between a device and a user, or with reference to both the distance change between the device and the user, and a movement direction of the device, for example, by recognizing a user's voice while the user lifts up the device and places the same close to the user's lips, it is possible to provide a voice recognition trigger that operates to accurately reflect a user's intention.

DETAILED DESCRIPTION

In the following detailed description of the present disclosure, references are made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different from each other, are not necessarily mutually exclusive. For example, specific shapes, structures and characteristics described herein may be implemented as modified from one embodiment to another without departing from the spirit and scope of the present disclosure. Furthermore, it shall be understood that the positions or arrangements of individual elements within each of the disclosed embodiments may also be modified without departing from the spirit and scope of the present disclosure. Therefore, the following detailed description is not to be taken in a limiting sense, and the scope of the present disclosure, if properly described, is limited only by the appended claims together with all equivalents thereof. In the drawings, like reference numerals refer to the same or similar functions throughout the several views.

Hereinafter, preferred embodiments of the present disclosure will be described in detail with reference to the accompanying drawings to enable those skilled in the art to easily implement the present disclosure.

First Embodiment of Present Disclosure

Hereinafter, the internal configuration of a voice recognition system 100 crucial for implementing the present disclosure and the functions of the respective components thereof will be discussed.

Figure 1:
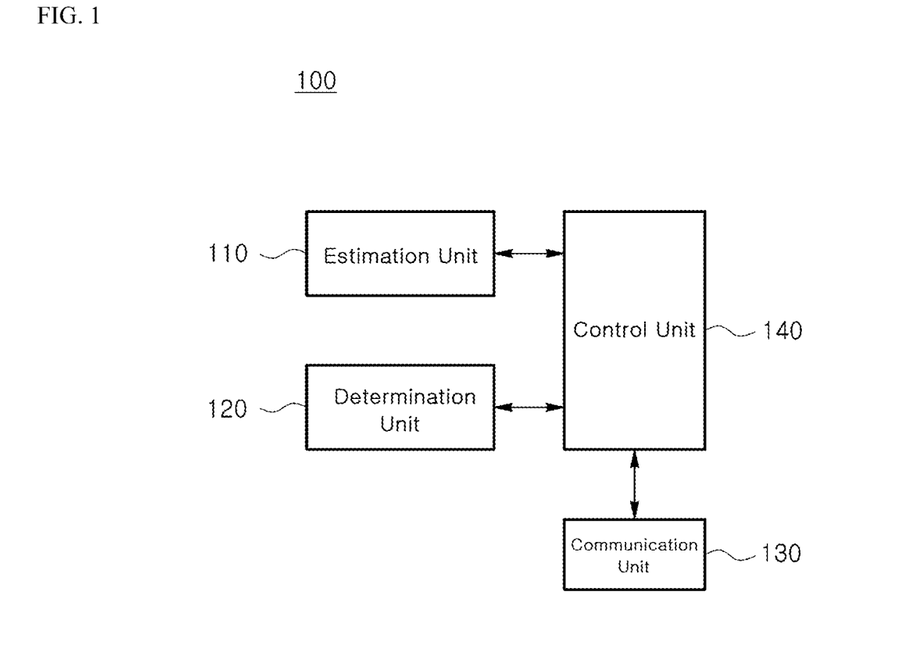
FIG. 1 illustratively shows the internal configuration of a voice recognition system according to a first embodiment of the present disclosure.

FIG. 1 illustratively shows the internal configuration of the voice recognition system 100 according to a first embodiment of the present disclosure.

Referring to FIG. 1, the voice recognition system 100 according to the first embodiment of the present disclosure may comprise an estimation unit 110, a determination unit 120, a communication unit 130, and a control unit 140. According to the first embodiment of the present disclosure, at least some of the estimation unit 110, the determination unit 120, the communication unit 130, and the control unit 140 may be program modules to communicate with an external system (not shown). The program modules may be included in the voice recognition system 100 in the form of operating systems, application program modules, and other program modules, while they may be physically stored in a variety of commonly known storage devices. Further, the program modules may also be stored in a remote storage device that may communicate with the voice recognition system 100. Meanwhile, such program modules may include, but not limited to, routines, subroutines, programs, objects, components, data structures, and the like for performing specific tasks or executing specific abstract data types as will be described below in accordance with the present disclosure.

Meanwhile, although the voice recognition system 100 has been described as above, the above description is illustrative, and it will be apparent to those skilled in the art that at least a part of the components or functions of the voice recognition system 100 may be implemented or included in a device 200 worn by a user or worn on a body part (e.g., a head, eye, finger, wrist, ear, neck, etc.) of the user, as necessary. Further, in some cases, all of the functions and components of the voice recognition system 100 may be implemented or included in the device 200.

The device 200 according to the first embodiment of the present disclosure is digital equipment having a memory means and a microprocessor for computing capabilities, and may include a wearable device such as smart glasses, a smart watch, a smart band, a smart ring, a smart necklace, a smart earset, smart earphones, and smart earrings, or include a somewhat traditional device such as a smart phone, a smart pad, a desktop computer, a notebook computer, a workstation, a personal digital assistant (PDA), a web pad, a mobile phone, and a remote controller. Besides the foregoing examples, the device 200 may be changed without limitation as long as the objects of the present disclosure may be achieved. Further, the device 200 according to the first embodiment of the present disclosure may include a microphone module (not shown) for recognizing or detecting a voice, and may include a proximity sensing module (not shown) for detecting a distance between the device 200 and the user, or a voice distance recognition module (not shown) for detecting a distance between the device 200 and a location where a voice detected by the device 200 is uttered.

Meanwhile, the device 200 according to the first embodiment of the present disclosure may include an application for assisting in performing the functions of providing a voice recognition trigger according to the present disclosure. The application may be downloaded from an external application distribution server (not shown). The characteristics of the program module may be generally similar to those of the estimation unit 110, the determination unit 120, the communication unit 130, and the control unit 140 of the voice recognition system 100 to be described below. Here, at least a part of the application may be replaced with a hardware device or a firmware device that may perform a substantially equal or equivalent function, as necessary.

First, the estimation unit 110 according to the first embodiment of the present disclosure may estimate a first distance, which is a distance between the device 200 and the user, on the basis of proximity information detected by the device 200.

Specifically, the estimation unit 110 according to the first embodiment of the present disclosure may estimate the first distance by obtaining information on a physical distance between the user and the device 200 from the proximity information detected by the device 200. To this end, the device 200 may include at least one sensing module (not shown) for detecting the proximity information. According to the first embodiment of the present disclosure, the sensing module may include at least one of known sensors such as an optical sensor, a photoelectric sensor, an ultrasonic sensor, an inductive sensor, a capacitive sensor, a resistive sensor, an eddy current sensor, an infrared sensor, and a magnetic sensor.

Further, according to the first embodiment of the present disclosure, the estimation unit 110 may estimate a second distance, which is a distance between the device 200 and a location where a voice detected by the device 200 is uttered, with reference to information on the voice detected by the device 200. According to the first embodiment of the present disclosure, the information on the voice detected by the device 200 may include an intensity, a waveform, and a frequency spectrum of the voice.

Specifically, the estimation unit 110 according to the first embodiment of the present disclosure may estimate the second distance, which is the distance between the device 200 and the location where the voice detected by the device 200 is uttered, by comparing the voice detected by the device 200 and a voice pattern thereof. According to the first embodiment of the present disclosure, the voice pattern may include a pattern of linear predictive coefficients (LPC) or perceptual linear prediction (PLP) coefficients representing voice spectrum information; a pattern of mel-frequency cepstral coefficients (MFCC) based on a human auditory model; and a pattern of a convolutional neural network (CNN) trained through machine learning or deep learning, or discriminative training.

For example, the estimation unit 110 according to the first embodiment of the present disclosure may estimate the distance between the device 200 and the location where the voice detected by the device 200 is uttered (i.e., the second distance) by comparing the voice detected by the device 200 and a voice pattern appearing according to a distance between the location where the voice is uttered and the location where the voice is detected. To this end, the estimation unit 110 according to the first embodiment of the present disclosure may refer to a predetermined voice pattern that appears according to a distance between a location where a voice is uttered and a location where the voice is detected, and may also refer to a database that stores information on a voice pattern appearing according to a distance between a location where a voice is uttered and a location where the voice is detected.

Meanwhile, through machine learning or deep learning for a voice uttered in at least one location, the estimation unit 110 according to the first embodiment of the present disclosure may also obtain a voice pattern according to the location where the voice is uttered. In this case, the estimation unit 110 according to the first embodiment of the present disclosure may estimate the distance between the device 200 and the location where the voice detected by the device 200 is uttered (i.e., the second distance) by comparing the voice detected by the device 200 and the voice pattern according to the location where the voice is uttered, which is obtained through the machine learning or deep learning. For the machine learning or deep learning, the estimation unit 110 according to the first embodiment of the present disclosure may employ at least one of known algorithms using a component analysis, matrix factorization, expectation maximization, hidden Markov model, Kalman filtering, k-nearest neighbor, boosting, support vector machine, association rule, confusion matrix, co-occurrence matrix, wavelet, maximum likelihood, Gaussian mixture model, decision tree, and the like.

Meanwhile, the estimation unit 110 according to the first embodiment of the present disclosure may employ at least one of known voice separation algorithms such as a likelihood ratio test (LRT) and blind source separation (BSS) in order to separate a voice and ambient noise with reference to the information on the voice detected by the device 200.

For example, the estimation unit 110 according to the first embodiment of the present disclosure may analyze signals detected from a plurality of voice recognition modules (not shown) of the device 200 through a BSS algorithm, thereby separating ambient noise from the voice detected by the device 200.

Next, the determination unit 120 according to the first embodiment of the present disclosure may determine whether the voice detected by the device 200 is an object of voice recognition, with reference to similarity between the first and second distances estimated by the estimation unit 110.

Specifically, when it is determined that the similarity between the distance between the device 200 and the user (i.e., the first distance) and the distance between the device 200 and the location where the voice detected by the device 200 is uttered (i.e., the second distance) is not less than a predetermined level, the determination unit 120 according to the first embodiment of the present disclosure may determine that the voice detected by the device 200 is an object of voice recognition. According to the first embodiment of the present disclosure, the predetermined level may be a criterion that is appropriately defined within a range for allowing a sensing (or recognition) module for measuring the first or second distance or a method for estimating the first or second distance to determine that the first and second distances are equal or similar.

For example, according to the first embodiment of the present disclosure, it may be assumed that a user utters a voice with the device 200 being positioned at a body part of the user (e.g., 3 cm from lips of the user) and that a distance between the device 200 and the user (i.e., a first distance) is estimated to be 2.8 cm, and a distance between the device 200 and a location where a voice detected by the device 200 is uttered (i.e., a second distance) is estimated to be 3 cm. In this case, the determination unit 120 may determine that the difference between the first and second distances is 0.2 cm and thus negligible, and that the voice detected by the device 200 is an object of voice recognition.

Further, the determination unit 120 according to the first embodiment of the present disclosure may determine whether the voice detected by the device 200 is an object of voice recognition, with further reference to whether the distance between the device 200 and the user (i.e., the first distance) and/or the distance between the device 200 and the location where the voice detected by the device 200 is uttered (i.e., the second distance) is within a predetermined distance.

For example, according to the first embodiment of the present disclosure, it may be assumed that a user utters a voice with the device 200 being positioned at a body part of the user (e.g., 25 cm from lips of the user) and that the estimation unit 110 estimates a distance between the device 200 and the user (i.e., a first distance) to be 25 cm and estimates a distance between the device 200 and a location where a voice detected by the device 200 is uttered (i.e., a second distance) to be 25.4 cm. In this case, the determination unit 120 may determine that the voice detected by the device 200 is not an object of voice recognition since the first distance and/or the second distance is greater than a predetermined distance (e.g., 10 cm), even though the difference between the first and second distances is negligible (0.4 cm in this case). That is, in this case, a voice recognition trigger according to the present disclosure may be provided only when the user positions the device 200 in a location close to a body part of the user according to the first embodiment of the present disclosure.

Meanwhile, the determination unit 120 according to the first embodiment of the present disclosure may determine whether the voice detected by the device 200 is an object of voice recognition, with further reference to whether the voice detected by the device 200 is uttered from a human body.

Specifically, the determination unit 120 according to the first embodiment of the present disclosure may analyze the information on the voice detected by the device 200 to determine whether the voice is uttered from a human body, and may determine whether the voice detected by the device 200 is an object of voice recognition, with reference to the result of the above determination. According to the first embodiment of the present disclosure, when it is determined that the voice detected by the device 200 is not uttered from a human body, the determination unit 120 may determine that the voice detected by the device 200 is not an object of voice recognition, even if it is determined that the first and second distances are similar. According to the first embodiment of the present disclosure, the determination unit 120 may employ at least one of known analysis algorithms such as an algorithm using a garbage model, an algorithm of Rabiner and Sambur using energy and zero-crossing, an algorithm of Lamel using a level equalizer, and an algorithm of Teager using energy, in order to determine whether the voice detected by the device 200 is uttered from a human body.

For example, the estimation unit 110 according to the first embodiment of the present disclosure may apply an algorithm using garbage modeling in order to determine whether the voice detected by the device 200 is uttered from a human body. In this case, the estimation unit 110 may define keywords that are to be determined as voices, and may give weight scores to voice keyword signals and give penalty scores to noise signals other than the voice keyword signals. When a score given to the voice detected by the device 200 is not less than a predetermined level, the estimation unit 110 may determine that the voice detected by the device 200 is uttered from a human body.

Next, according to the first embodiment of the present disclosure, the communication unit 130 may function to enable data transmission/reception from/to the estimation unit 110 and the determination unit 120.

Lastly, according to the first embodiment of the present disclosure, the control unit 140 may function to control data flow among the estimation unit 110, the determination unit 120, and the communication unit 130. That is, the control unit 140 may control data flow into/out of the voice recognition system 100 or data flow among the respective components of the voice recognition system 100, such that the estimation unit 110, the determination unit 120, and the communication unit 130 may carry out their particular functions, respectively.

Figure 2:
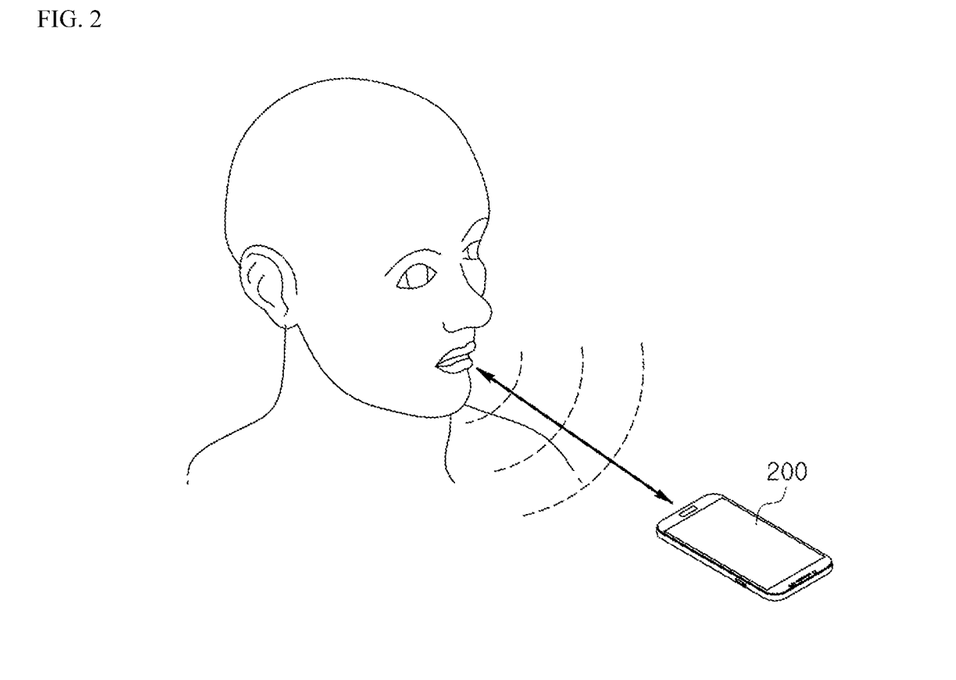
FIG. 2 illustratively shows a situation in which a voice recognition trigger is provided through the voice recognition system according to the first embodiment of the present disclosure.

FIG. 2 illustratively shows a situation in which a voice recognition trigger is provided through the voice recognition system 100 according to the first embodiment of the present disclosure.

Referring to FIG. 2, it may be assumed that a voice recognition trigger is provided to a user who uses a smart phone 200 including the voice recognition system 100 according to the first embodiment of the present disclosure. According to the first embodiment of the present disclosure, when the user positions the smart phone 200 close to lips of the user, the voice recognition system 100 may estimate a distance between the smart phone 200 and the user (i.e., a first distance) on the basis of proximity information detected by a distance detection sensor (not shown) of the smart phone 200. When the user utters a voice, the voice recognition system 100 may estimate a distance between the smart phone 200 and a location where a voice detected by the smart phone 200 is uttered (i.e., a second distance) by comparing a voice detected by a microphone module (not shown) of the smart phone 200 and a voice pattern appearing according to the distance between the smart phone 200 and the location where the voice detected by the smart phone 200 is uttered.

Next, the voice recognition system 100 according to the first embodiment of the present disclosure may determine whether the voice detected by the smart phone 200 is an object of voice recognition, with reference to similarity between the first and second distances estimated as above. That is, a voice recognition trigger may be provided to the user when the voice recognition system 100 according to the first embodiment of the present disclosure determines that the voice detected by the smart phone 200 is the object of voice recognition. Therefore, through the technique of providing a voice recognition trigger according to the present disclosure, it is possible to shorten the time that a user takes to input a voice by eliminating unnecessary processes for starting a voice input. Further, it is also possible to minimize the influence of ambient noise by allowing a voice to be inputted in proximity to the device, and to provide a voice recognition trigger that is accurately activated even with a small voice of the user.

Figure 3:
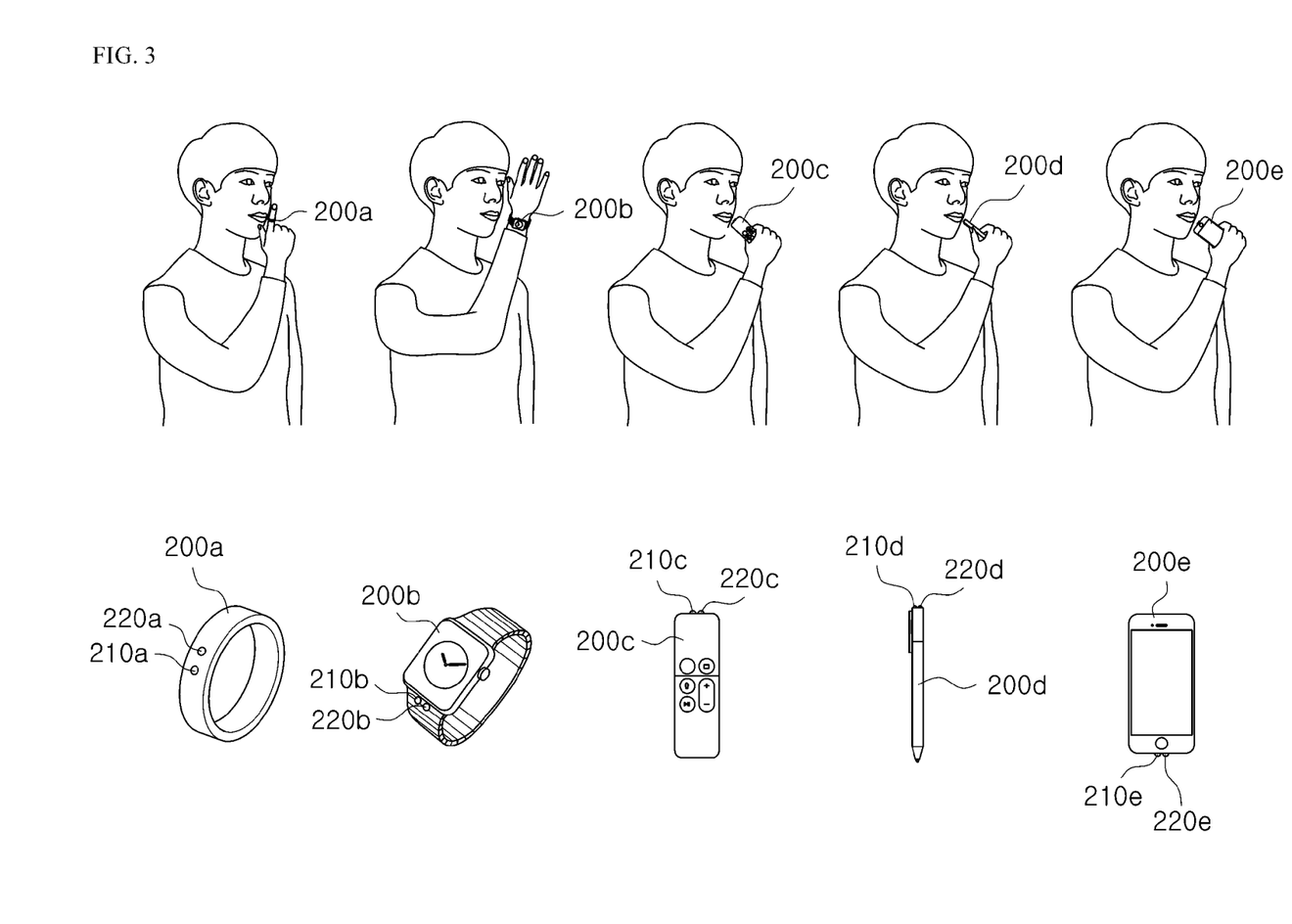
FIG. 3 illustratively shows various embodiments in which the voice recognition system according to the first embodiment of the present disclosure may be utilized.

FIG. 3 illustratively shows various embodiments in which the voice recognition system 100 according to the first embodiment of the present disclosure may be utilized.

Referring to FIG. 3, according to the first embodiment of the present disclosure, it may be assumed that a voice recognition trigger is provided to a user as the user utters a voice with a smart ring 200a, a smart watch 200b, a smart remote controller 200c, a smart pen 200d, or a smart phone 200e (including the voice recognition system 100 according to the present disclosure) being positioned close to a mouth (or lips) of the user. According to the first embodiment of the present disclosure, the device 200a, 200b, 200c, 200d or 200e may include a sensing module 210a, 210b, 210c, 210d or 210e for detecting proximity information, or a recognition module 220a, 220b, 220c, 220d or 220e for detecting voice information. The sensing module 210a, 210b, 210c, 210d or 210e for detecting proximity information may be disposed in a location physically close to the recognition module 220a, 220b, 220c, 220d or 220e for detecting voice information, so that the objects of the present disclosure may be achieved.

Further, according to the first embodiment of the present disclosure, when it is determined that a distance between the device 200a, 200b, 200c, 200d or 200e and the user (i.e., a first distance) and a distance between the device 200a, 200b, 200c, 200d or 200e and a location where a voice detected by the device 200a, 200b, 200c, 200d or 200e is uttered (i.e., a second distance) are similar at or above a predetermined level and are within a predetermined distance (i.e., when it is determined that the first and second distances are equal or similar, in a state in which the device 200a, 200b, 200c, 200d or 200e is positioned in proximity to the mouth or lips of the user), the voice detected by the device 200a, 200b, 200c, 200d or 200e is determined to be an object of voice recognition, so that the objects of the present disclosure may be achieved.

Second Embodiment of the Present Disclosure

Figure 4:
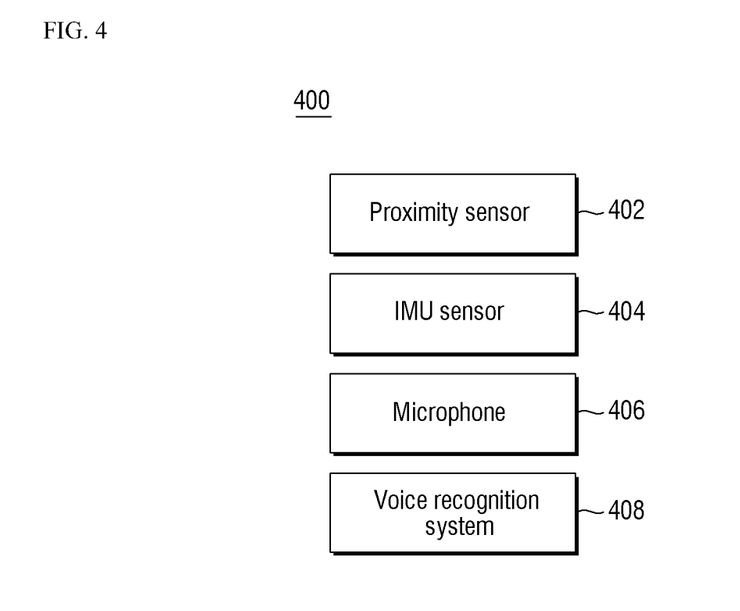
FIG. 4 is a functional block diagram schematically showing a configuration of a device according to a second embodiment of the present disclosure.

FIG. 4 is a functional block diagram schematically showing a functional configuration of a device according to a second embodiment of the present disclosure.

Referring to FIG. 4, a device 400 according to the second embodiment of the present disclosure may include a proximity sensor 402, an IMU sensor 404, a microphone 406, and a voice recognition system 408. The constituent elements shown in FIG. 4 do not reflect all the functions of the device 400 and also are not essential. Therefore, the device 400 may include constituent elements more or fewer than those listed above.

The proximity sensor 402 of the device 400 according to the second embodiment of the present disclosure performs a function of detecting a distance between the device 400 and an object. In one embodiment, proximity information of the device 400 may be obtained by the proximity sensor 402. In one embodiment of the present disclosure, the proximity sensor 202 may include at least one of known sensors such as an optical sensor, a photoelectric sensor, an ultrasonic sensor, an inductive sensor, a capacitive sensor, a resistive sensor, an eddy current sensor, an infrared sensor, a magnetic sensor, and the like.

The IMU sensor 404 of the device 400 according to the second embodiment of the present disclosure performs a function of detecting movement of the device 400. In one embodiment, movement information (e.g., a height change value) of the device 400 may be obtained by the IMU sensor 404.

The microphone 406 of the device 400 according to the second embodiment of the present disclosure performs a function of detecting a user' voice. According to one embodiment of the present disclosure, when it is determined whether or not a voice recognition trigger of the device 400 is provided, the device 400 may recognize the user's voice through the microphone 406. Thus, the device 400 may perform an operation requested by the user.

According to the second embodiment of the present disclosure, the proximity sensor 402, the IMU sensor 404, and the microphone 406 included in the device 400 may be arranged at positions physically close to each other.

According to the second embodiment of the present disclosure, the proximity sensor 402, the IMU sensor 404, and the microphone 406 included in the device 400 may be configured to operate sequentially according to predetermined conditions. In one embodiment, the IMU sensor 404 and/or the microphone 406 may be configured to operate when the distance between the device 400 and the object, which is detected by the proximity sensor 402, is equal to or less than a predetermined distance. In one embodiment, when the device 400 is stopped after moving upward, the proximity sensor 402 and/or the microphone 406 may be configured to operate. In this case, the movement direction of the device 400 may be detected by the IMU sensor 404.

As described above, according to the second embodiment, by configuring the proximity sensor 402, the IMU sensor 404, and the microphone 406 included in the device 400 to sequentially operate according to the predetermined conditions, it is possible to implement an efficient low power design. Further, by configuring one sensor to operate in a case in which the predetermined conditions are satisfied by another sensor and perform determination as to whether or not a voice recognition trigger is provided, it is possible to improve accuracy of the provision of the voice recognition trigger.

The voice recognition system 408 of the device 400 according to the second embodiment of the present disclosure performs a function of providing the voice recognition trigger to the user. The voice recognition system 408 according to the second embodiment of the present disclosure may calculate a distance change between the device 400 and the object, and may determine whether or not the voice recognition trigger of the device 400 is provided with reference to the calculated result. A specific configuration of the voice recognition system 408 according to the second embodiment of the present disclosure will be described again later.

The voice recognition system 408 according to the second embodiment of the present disclosure may be included in the device 400 in the form of an application that assists a function of providing the voice recognition trigger. Such an application may be downloaded from an external application distribution server (not shown). At least a portion of the application may be replaced with a hardware device or a firmware device that may perform a substantially equal or equivalent function, as necessary.

Figure 5:
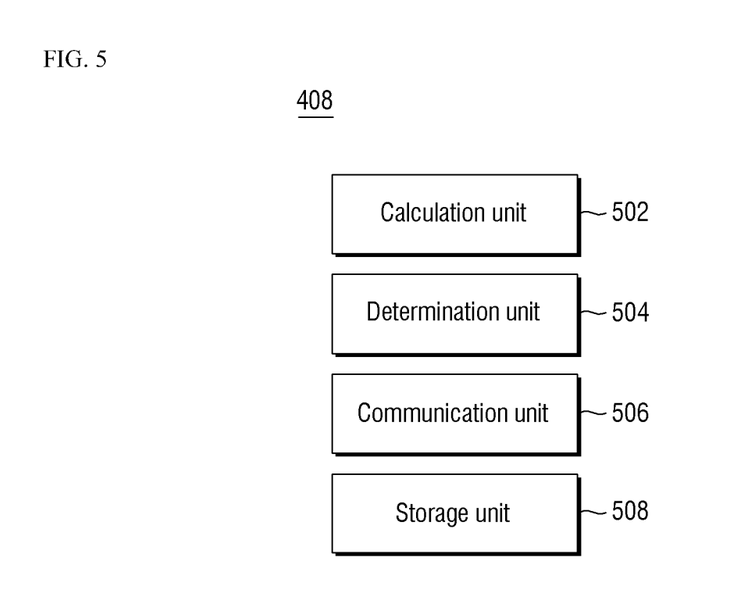
FIG. 5 is a functional block diagram schematically showing a functional configuration of a voice recognition system according to the second embodiment of the present disclosure.

FIG. 5 is a functional block diagram schematically showing a functional configuration of the voice recognition system according to the second embodiment of the present disclosure.

Referring to FIG. 5, the voice recognition system 408 according to the second embodiment of the present disclosure may include a calculation unit 502, a determination unit 504, a communication unit 506, and a storage unit 508. The constituent elements shown in FIG. 5 do not reflect all the functions of the voice recognition system 408 and also are not essential. Therefore, the voice recognition system 408 may include constituent elements more or fewer than those listed above.

According to the second embodiment of the present disclosure, at least some of the calculation unit 502, the determination unit 504, the communication unit 506, and the storage unit 508 may be program modules to communicate with an external system (not shown). The program modules may be included in the voice recognition system 408 in the form of operating systems, application program modules, and other program modules, while they may be physically stored in a variety of commonly known storage devices. Further, the program modules may also be stored in a remote storage device that may communicate with the voice recognition system 408. Meanwhile, such program modules may include, but not limited to, routines, subroutines, programs, objects, components, data structures, and the like for performing specific tasks or executing specific abstract data types as will be described below in accordance with the present disclosure.

Although the voice recognition system 408 has been described as above, the above description is illustrative, and it will be apparent to those skilled in the art that at least a portion of the constituent elements or functions of the voice recognition system 408 may be implemented or included in the device 400 worn by the user or worn on a body portion (e.g., finger, wrist, or the like) of the user, as necessary. Further, in some cases, all of the functions and constituent elements of the voice recognition system 408 may be implemented or included in the device 400.

The calculation unit 502 of the voice recognition system 408 according to the second embodiment of the present disclosure performs a function of calculating the distance change between the device 400 and the object on the basis of the proximity information detected by the device 400. As an example, the calculation unit 502 may calculate a time-dependent change in distance between the device 400 and the object by obtaining information about a physical distance between the object and the device 400 from the proximity information detected by the device 400. Here, the object may be the mouth or lips of the user, and alternatively, may be another body portion of the user or a specific portion of another object. In one embodiment, the proximity information may be detected by the proximity sensor 402 included in the device 400.

Further, the calculation unit 502 of the voice recognition system 408 according to the second embodiment of the present disclosure may also perform a function of calculating the movement direction of the device 400 on the basis of movement information detected by the device 400. As an example, the calculation unit 502 may calculate the movement direction of the device 400 by obtaining information about changes in acceleration, velocity and position of the device 400 according to the physical movement of the device 400. In one embodiment, such movement information may be detected by the IMU sensor 404 included in the device 400.

The determination unit 504 of the voice recognition system 408 according to the second embodiment of the present disclosure performs the function of determining a voice recognition start point at which the device 400 starts voice recognition and determining whether or not the voice recognition trigger is provided, with reference to the distance change between the device 400 and the object, which is calculated by the calculation unit 502.

As an example, the determination unit 504 may determine, as the voice recognition start point, a point at which the device 400 is adjacent to the object within a predetermined distance as the device 400 approaches the object at a speed equal to or less than a predetermined speed. That is, the determination unit 504 may determine, as the voice recognition start point, a time point at which the device 400 gradually approaches the object and is close to the object within the predetermined distance.

As another example, the determination unit 504 may determine, as the voice recognition start point, a time point at which a distance between the device 400 and the object is held constant in the state in which the device 400 is adjacent to the object within the predetermined distance. In one embodiment, the determination unit 504 may determine, as the voice recognition start point, a time point at which a time period during which the distance between the device 400 and the object is held constant in the state in which the device 400 is adjacent to the object within the predetermined distance reaches a predetermined time period. According to this, the voice recognition trigger may be provided when the user places the device 400 in proximity to the object.

Further, the determination unit 504 of the voice recognition system 408 according to second embodiment of the present disclosure may perform the function of determining the voice recognition start point of the device 400, and determining as to whether or not the voice recognition trigger is provided, with reference to the distance change between the device 400 and the object and the movement direction of the device 400, which are calculated by the calculation unit 502.

As an example, the determination unit 504 may determine, as the voice recognition start point, a time point at which the device 400 is stopped after moving upward and decelerating. In one embodiment, when the distance between the device 400 and the object at the time point at which the device 400 has stopped is within the predetermined distance, the determination unit 504 may determine the stop time as the voice recognition start point. According to this, the voice recognition trigger may be provided when the user lifts up the device 400 in the upward direction.

As another example, in the case that the object is the mouth or lips of the user, the determination unit 504 may determine, as the voice recognition start point, a time point at which the device 400 moves upward and comes close to the object within the predetermined distance. The time point at which the device 400 is adjacent to the object within the predetermined distance may be, for example, a time point at which the device 400 comes close to the object (e.g., the lips of the user) within a distance of 3 cm. According to this, the voice recognition trigger may be provided when the user lifts up the device 400 and places the device 400 close to his/her own lips.

The communication unit 506 of the voice recognition system 408 according to the second embodiment of the present disclosure may function to enable data transmission/reception from/to the calculation unit 502, the determination unit 504, and the storage unit 508, and may also communicate with an external communication network of the voice recognition system 408.

The storage unit 508 of the voice recognition system 408 according to the second embodiment of the present disclosure may perform a function of storing data necessary for operating the voice recognition system 408. Examples of the data stored in the storage unit 508 may include information about the distance change between the device 400 and the object the movement direction of the device 400, which are calculated by the calculation unit 502, information about the voice recognition start point determined by the determination unit 504, and the like.

Figure 6A:
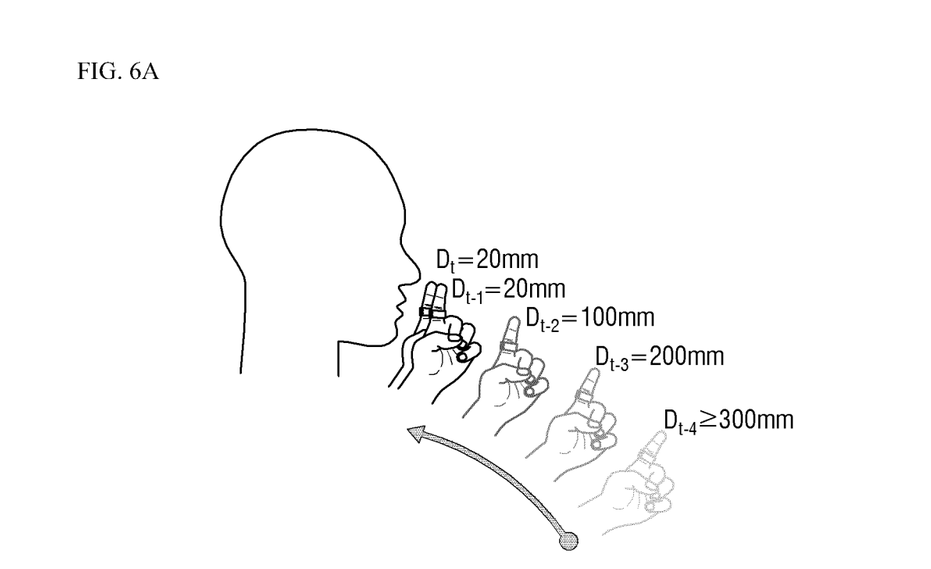
FIG. 6A illustratively shows a situation in which a voice recognition trigger is provided through the voice recognition system according to the second embodiment of the present disclosure.
Figure 6B:
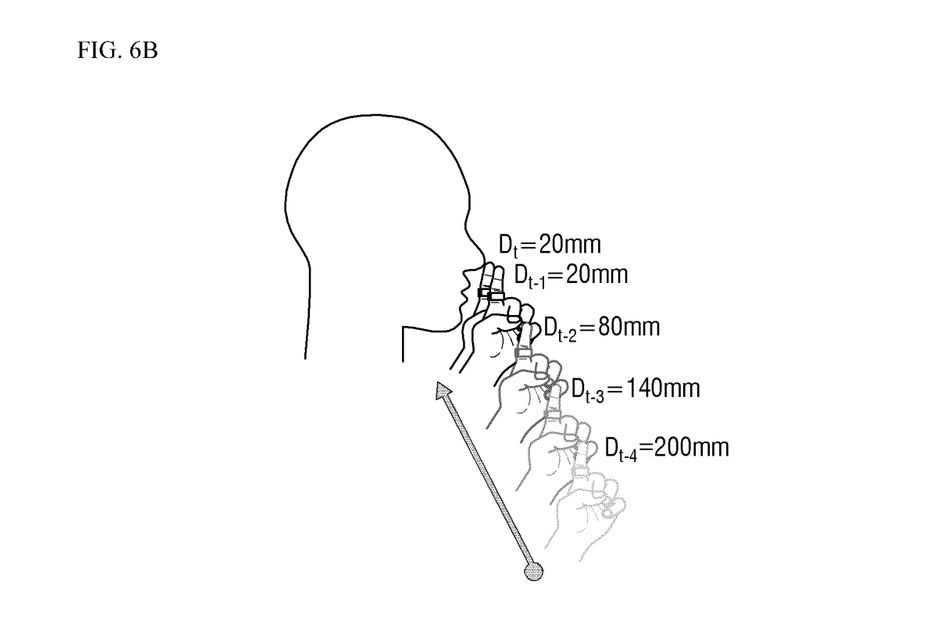
FIG. 6B illustratively shows a situation in which a voice recognition trigger is provided through the voice recognition system according to the second embodiment of the present disclosure.

FIGS. 6A and 6B illustratively show a situation in which the voice recognition trigger is provided through the voice recognition system according to the second embodiment of the present disclosure. In FIGS. 6A and 6B, there are illustratively shown examples in which a smart ring is used as the device 400 incorporating the voice recognition system 408 and an object is the lips of the user.

FIG. 6A illustratively shows a situation in which the user moves the smart ring parabolically in an upward direction, that is, a direction oriented to his/her lips, in a state in which the user wears the smart ring on his/her finger, and subsequently, stops the movement of the smart ring when the smart ring is adjacent to his/her lips. As shown in FIG. 6A, distances D between the smart ring and the user's lips, which are measured at each time point t-4, t-3, t-2, t-1, and t, are 300 mm or more ($D_{t-4}$), 200 mm ($D_{t-3}$), 100 mm ($D_{t-2}$), 20 mm ($D_{t-1}$), and 20 mm ($D_t$), respectively.

According to one embodiment, as the user moves the smart ring near his/her mouth, the voice recognition system 408 may estimate that a distance between the smart ring and the user gradually shortens from far to near on the basis of proximity information (i.e., a distance change value) detected by a proximity sensor of the smart ring.

FIG. 6B illustratively shows a situation in which the user moves the smart ring linearly in an upward direction, that is, a direction oriented to his/her lips, in the state in which the user wears the smart ring on his/her finger, and subsequently, stops the movement of the smart ring when the smart ring is adjacent to his/her lips. As shown in FIG. 6B, distances D between the smart ring and the user's lips, which are measured at each time point t-4, t-3, t-2, t-1, and t, are 200 mm ($D_{t-4}$), 140 mm ($D_{t-3}$), 80 mm ($D_{t-2}$), 20 mm ($D_{t-1}$) and 20 mm ($D_t$), respectively.

Like the case of FIG. 6A, as the user moves the smart ring near his/her lips, the voice recognition system 408 may estimate that the distance between the smart ring and the user gradually shortens from far to near on the basis of the proximity information detected by the proximity sensor of the smart ring.

As described above, whether or not the voice recognition trigger of the device is provided is determined with reference to the distance change between the device and the object. Thus, when the user places the device close to his/her lips, the voice recognition trigger may be accurately provided.

Although a case in which whether or not the voice recognition trigger of the device is provided is determined by referring to merely the distance change between the device and the object has been described with reference to FIGS. 6A and 6B, whether or not the voice recognition trigger of the device is provided may be determined with reference to both the distance change between the device and the object and the movement direction of the device.

Figure 7A:
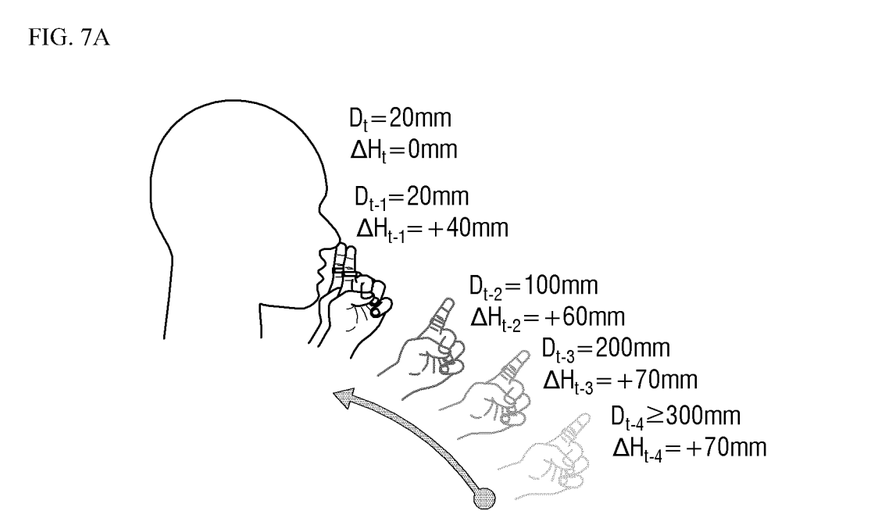
FIG. 7A illustratively shows another situation in which the voice recognition trigger is provided through the voice recognition system according to the second embodiment of the present disclosure.
Figure 7B:
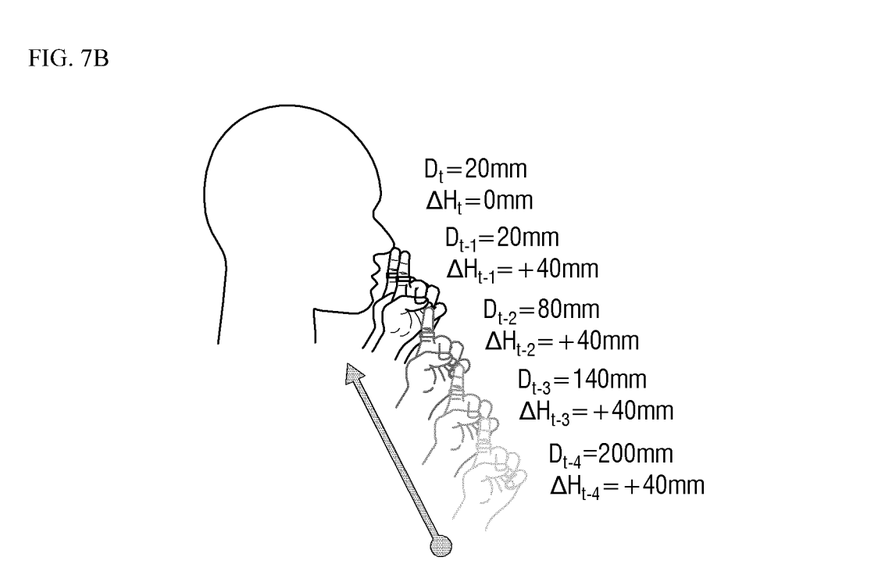
FIG. 7B illustratively shows another situation in which the voice recognition trigger is provided through the voice recognition system according to the second embodiment of the present disclosure.

FIGS. 7A and 7B illustratively show another situation in which the voice recognition trigger is provided through the voice recognition system according to the second embodiment of the present disclosure. In FIGS. 7A and 7B, like in FIGS. 6A and 6B, there are illustratively shown examples in which a smart ring is used as the device 400 incorporating the voice recognition system 408 and an object is the lips of the user.

FIG. 7A illustratively shows a situation in which the user moves the smart ring parabolically in an upward direction, that is, a direction oriented to his/her lips, in a state in which the user wears the smart ring on his/her finger, and subsequently, stops the movement of the smart ring when the smart ring is adjacent to his/her lips. As shown in FIG. 7A, distances D between the smart ring and the user's lips, which are measured at each time point t-4, t-3, t-2, t-1, and t, are 300 mm or more ($D_{t-4}$), 200 mm ($D_{t-3}$), 100 mm ($D_{t-2}$), 20 mm ($D_{t-1}$), and 20 mm ($D_t$), respectively, and height change values $\Delta H$ of the smart ring are equal to +70 mm ($\Delta H_{t-4}$), +70 mm ($\Delta H_{t-3}$), +60 mm ($\Delta H_{t-2}$), +40 mm ($\Delta H_{t-1}$), and +0 mm ($\Delta H_t$), respectively.

According to one embodiment, as the user moves the smart ring near his/her lips, the voice recognition system 408 may estimate that a distance between the smart ring and the user gradually shortens from far to near on the basis of proximity information (i.e., a distance change value) detected by a proximity sensor of the smart ring. Further, the voice recognition system 408 may estimate that the smart ring has moved in the upward direction on the basis of the movement information (i.e., a height change value) detected by an IMU sensor of the smart ring.

FIG. 7B illustratively shows a situation in which the user moves the smart ring linearly in an upward direction, that is, a direction oriented to his/her lips, in the state in which the user wears the smart ring on his/her finger, and subsequently, stops the movement of the smart ring when the smart ring is adjacent to his/her lips. As shown in FIG. 7B, distances D between the smart ring and the user's lips, which are measured at each time point t-4, t-3, t-2, t-1, and t, are 200 mm ($D_{t-4}$), 140 mm ($D_{t-3}$), 80 mm ($D_{t-2}$), 20 mm ($D_{t-1}$) and 20 mm ($D_t$), respectively, and the height change values $\Delta H$ of the smart ring are +40 mm ($\Delta H_{t-4}$), +40 mm ($\Delta H_{t-3}$), +40 mm ($\Delta H_{t-2}$), +40 mm ($\Delta H_{t-1}$), and +0 mm ($\Delta H_t$), respectively.

Like the case of FIG. 7A, as the user moves the smart ring near his/her lips, the voice recognition system 408 may estimate that the distance between the smart ring and the user gradually shortens from far to near on the basis of the proximity information detected by the proximity sensor of the smart ring, and may estimate that the smart ring has moved in the upward direction on the basis of the movement information detected by the IMU sensor of the smart ring.

As described above, whether or not the voice recognition trigger of the device is provided is determined with reference to the distance change between the device and the object and the movement information of the device. Thus, when the user lifts up and places the device close to his/her lips, the voice recognition trigger may be accurately provided.

Figure 8:
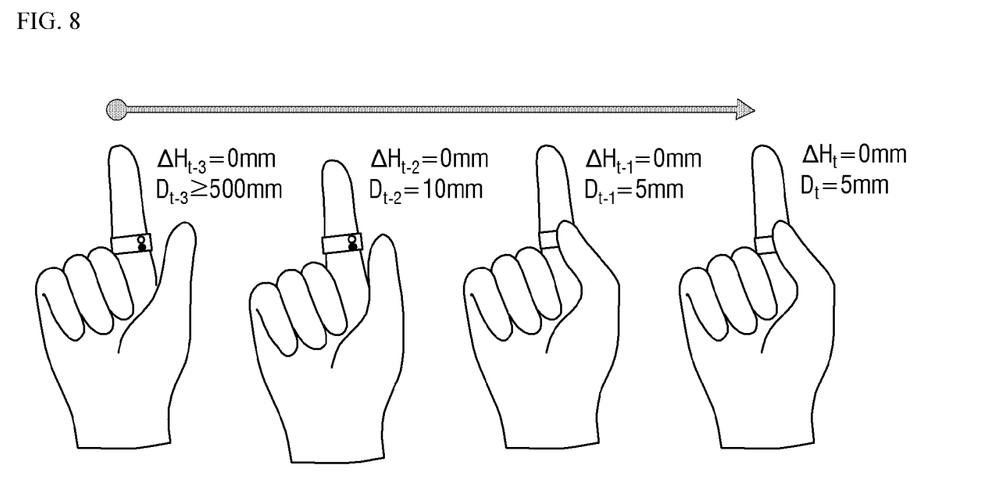
FIG. 8 illustratively shows a situation in which the voice recognition trigger is not provided through the voice recognition system according to the second embodiment of the present disclosure.

FIG. 8 illustratively shows a situation in which the voice recognition trigger is not provided through the voice recognition system according to the second embodiment of the present disclosure.

FIG. 8 shows a situation in which the user approaches a sensor (the proximity sensor and the IMU sensor) included in the smart ring with his/her other finger while wearing the smart ring on his/her one finger. In this case, the proximity sensor of the smart ring may be obscured by the other finger on which the smart ring is not worn. As a result, a distance between the smart ring and the object, which is detected by the proximity sensor of the smart ring, is sharply shortened from 500 mm or more to 10 mm. Accordingly, in the voice recognition system 408, the voice recognition trigger of the smart ring is not provided. That is, in the voice recognition system 408, even if the distance between the smart ring and the user is shortened within a predetermined distance, in a situation other than the case in which the distance between the smart ring and the user is estimated to be gradually shortened from far to near on the basis of the proximity information (i.e., the distance change value) detected by the proximity sensor of the smart ring, the voice recognition trigger of the smart ring may not be provided.

As described above, by determining whether or not the voice recognition trigger of the device is provided with reference to the gradual distance change between the device and the object, it is possible to prevent the voice recognition trigger from being provided in a situation in which the sensor included in the device is covered or obscured by a body portion or another object.

Figure 9:
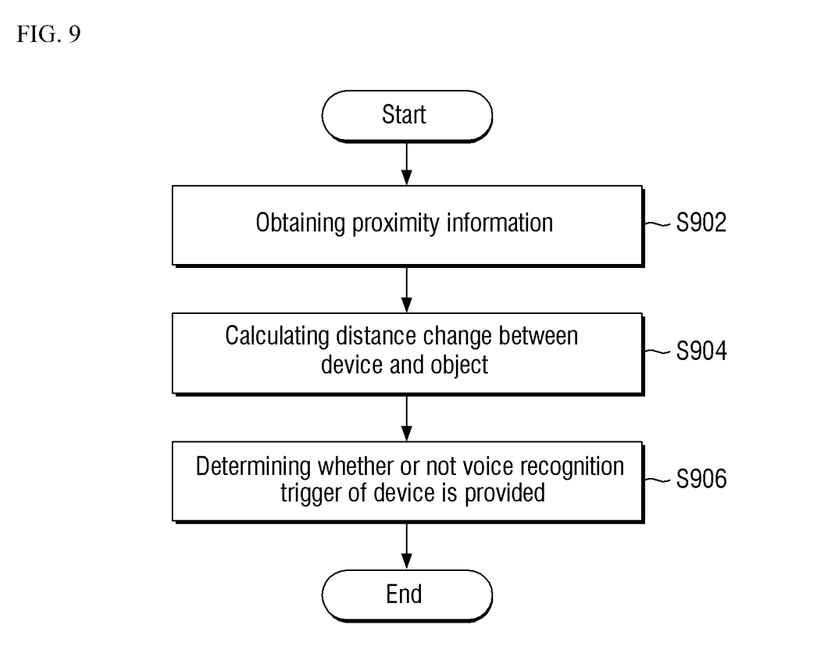
FIG. 9 is a flowchart illustratively showing a method for providing a voice recognition trigger according to the second embodiment of the present disclosure.

FIG. 9 is a flowchart illustratively showing a method for providing a voice recognition trigger according to the second embodiment of the present disclosure.

The method for providing a voice recognition trigger of the device begins from step S902 in which the voice recognition system 408 obtains the proximity information detected by the device 400. In step S902, the voice recognition system 408 may obtain both the proximity information and the movement information detected by the device 400. In one embodiment, the proximity information may be obtained by the proximity sensor 402 of the device 400, and the movement information may be obtained by the IMU sensor 404 of the device 400. In another embodiment, the proximity sensor 402 and the IMU sensor 404 of the device 400 may be configured to operate in a sequential manner according to a predetermined condition. For example, the IMU sensor 404 may be configured to operate when a distance between the device 400 and the object, which is detected by the proximity sensor 402, falls within a predetermined distance.

In step S904, the voice recognition system 408 may calculate a change in distance between the device 400 and the object on the basis of the proximity information. Alternatively, in step S904, the voice recognition system 408 may calculate the distance change between the device 400 and the object on the basis of the proximity information, and may calculate a movement direction of the device 400 on the basis of the movement information.

In step S906, the voice recognition system 408 may determine a voice recognition start point of the device 400 and whether or not the voice recognition trigger is provided with reference to the distance change between the device 400 and the object. As an example, the voice recognition system 408 may determine, as the voice recognition start point, a point at which the device 400 is adjacent to the object within a predetermined distance as the device 400 approaches the object at a speed equal to or less than a predetermined speed. As another example, the voice recognition system 408 may determine, as the voice recognition start point, a time point at which the distance between the device 400 and the object is held constant in the state in which the device 400 is adjacent to the object within the predetermined distance with reference to the distance change between the device 400 and the object. In this case, the voice recognition system 408 may determine, as the voice recognition start point, a time point at which a time period during which the distance between the device 400 and the object is held constant in the state in which the device 400 is adjacent to the object within the predetermined distance reaches a predetermined time period.

Further, in step S906, the voice recognition system 408 may determine a time point when the device 400 starts voice recognition and whether or not the voice recognition trigger of the device is provided, with reference to both the distance change between the device 400 and the object and the movement direction of the device 400. As an example, the voice recognition system 408 may determine, as the voice recognition start point, a time point at which the device 400 is stopped after moving upward and decelerating with reference to both the distance change between the device 400 and the object and the movement direction of the device 400. As another example, the voice recognition system 408 may determine, as the voice recognition start point, a time point at which the device 400 moves upward and comes close to the object within the predetermined distance.

The embodiments according to the present disclosure as described above may be implemented in the form of program instructions that can be executed by various computer components, and may be stored on a non-transitory computer-readable recording medium. The non-transitory computer-readable recording medium may include program instructions, data files, data structures and the like, separately or in combination. The program instructions stored on the non-transitory computer-readable recording medium may be specially designed and configured for the present disclosure, or may also be known and available to those skilled in the computer software field. Examples of the non-transitory computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be configured to operate as one or more software modules to perform the processes of the present disclosure, and vice versa.

Although the present disclosure has been described above in terms of specific items such as detailed elements as well as the limited embodiments and the drawings, they are only provided to help more general understanding of the present disclosure, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the present disclosure.

What is claimed is:

1. A method for providing a voice recognition trigger, comprising the steps of:
    calculating a distance change between a device and an object on the basis of proximity information detected by the device; and
    determining whether or not the voice recognition trigger of the device is provided with reference to the distance change between the device and the object,
    wherein, in the determining step, a time point at which the distance between the device and the object is held constant in a state in which the device is adjacent to the object within a predetermined distance after the device approaches the object at a speed equal to or less than a predetermined speed and the distance between the device and the object gradually shortens from far to near on the basis of proximity information, is determined as a voice recognition start point.

2. The method of claim 1, wherein the proximity information is obtained by a proximity sensor of the device.

3. The method of claim 1, wherein a time point at which a time period during which the distance between the device and the object is held constant in the state in which the device is adjacent to the object within the predetermined distance reaches a predetermined time period, is determined as a voice recognition start point.

4. A method for providing a voice recognition trigger, comprising the steps of:
    calculating a distance change between a device and an object on the basis of proximity information detected by the device, and calculating a movement direction of the device on the basis of movement information detected by the device; and
    determining whether or not the voice recognition trigger of the device is provided with reference to the distance change between the device and the object and the movement direction of the device,
    wherein, in the determining step, a time point at which the device is stopped in a state in which the device is adjacent to the object within a predetermined distance, after the device moves upward and approaches the object at a speed equal to or less than a predetermined speed, and the distance between the device and the object gradually shortens from far to near on the basis of the proximity information, is determined as a voice recognition start point.

5. The method of claim 4, wherein the proximity information is obtained by a proximity sensor of the device, and the movement information is obtained by an IMU sensor of the device.

6. A non-transitory computer-readable recording medium recording a computer program for executing the method of claim 1.

7. A voice recognition system for providing a voice recognition trigger, comprising:
    a calculation unit configured to calculate a distance change between a device and an object on the basis of proximity information detected by the device; and
    a determination unit configured to determine whether or not the voice recognition trigger of the device is provided with reference to the speed of the device and the distance change between the device and the object,
    wherein the determination unit determines a time point at which the distance between the device and the object is held constant in a state in which the device is adjacent to the object within a predetermined distance after the device approaches the object at a speed equal to or less than a predetermined speed and the distance between the device and the object gradually shortens from far to near on the basis of proximity information, as a voice recognition start point.

* * * * *